April 22, 1958

H. WURZEL 2,831,716

RELEASABLE COUPLINGS

Filed April 4, 1955

INVENTOR
HUGO WURZEL

BY J. Harold Kilcoyne

ATTORNEY

United States Patent Office 2,831,716
Patented Apr. 22, 1958

2,831,716

RELEASABLE COUPLINGS

Hugo Wurzel, Bronx, N. Y., assignor to Waldes Kohinoor, Inc., Long Island City, N. Y., a corporation of New York Application April 4, 1955, Serial No. 498,800

2 Claims. (Cl. 287—52.05)

This invention relates to improvements in releasable couplings, and more particularly to a coupling providing an axially separable connection between two concentric members and to an improved coupling ring for use in such a coupling.

It is of course well known to couple concentric members such as a shaft in a housing or a tool stem or shank in a tool handle by means of a coupling ring which seats in a groove provided therefor in one of said members and extends as a coupling or locking shoulder into a radially aligned groove provided in the other member. The assembly of such a coupling ring in the aligned grooves is rendered difficult because of the fact that each of the concentric members covers the groove of the other member, but it can be achieved by providing the ring-carrying member with an inclined surface portion extending between its end face and the groove, which is capable of spreading or contracting the ring as required to seat it. For example, if the outer or housing member provides the ring-carrying member, it is provided between its end face and groove with an inclined surface for effecting contraction of the ring as the latter moves thereover to the plane of the groove. Likewise, if the ring is adapted to seat in the groove of a shaft, it may be expanded by providing the shaft portion extending between the shaft end and the groove with an inclined surface for effecting expansion of the ring as it is moved over the shaft end to the plane of the groove.

In addition to the assembly of coupling rings in radially aligned grooves of the two members to be coupled thereby being difficult as aforesaid, the resulting coupling is open to the objection that once finally made it cannot be readily separated, due to the fact that the ring is confined and held between the conventionally straight side walls or faces of the aligned grooves of said members in which the ring operates. Accordingly, to separate the members held by the ring, it becomes necessary to shear the ring axially, which not only destroys it but also requires very great force.

Stated broadly, a principal object of the invention is to provide a releasable coupling for two concentric members such as a shaft contained in the housing or a tool shank or stem and its handle.

More particularly, it is an object of the invention to provide a coupling which is as equally effective as are the prior permanent ring-type couplings employed to couple two concentric members together against axial separation in one direction but which is readily separable against forces applied in the opposite axial direction.

Another object of the invention is the provision of a simple and effective one-way coupling between two concentric members, characterized by a coupling ring seating in a groove provided in one of said members and which extends into a radially aligned groove provided in the other of said members.

A still further object of the invention is the provision of a releasable coupling for two concentric members, which employs as the coupling element thereof a spring ring having the shape of a truncated cone operating in radially aligned grooves provided in said members, which grooves are specially fashioned and arranged so as to effect disengagement of the ring from its seating groove under relatively small forces applied in one direction, while insuring normal coupling action of the ring under any and all forces applied in the opposite direction.

The above and other objects and advantages of the invention will appear from the following detailed description thereof, in which reference is had to the accompanying drawing illustrating the coupling ring and two forms of coupling employing same according to the invention, wherein.

Figure 1:
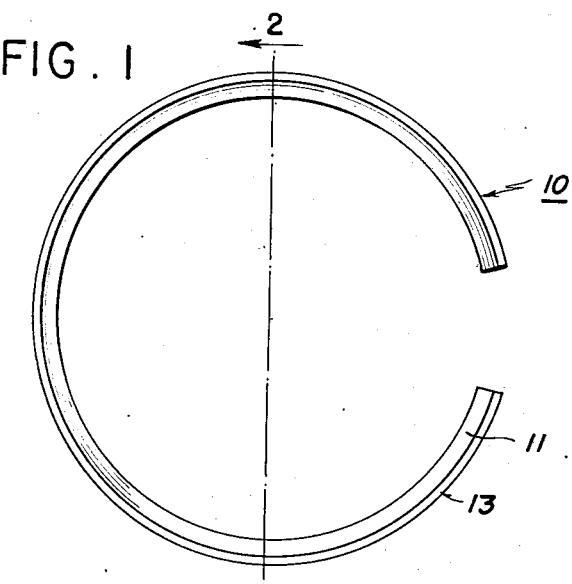
Fig. 1 is a plan view of an open-ended spring ring proposed herein for use in coupling two concentric members.
Figure 2:
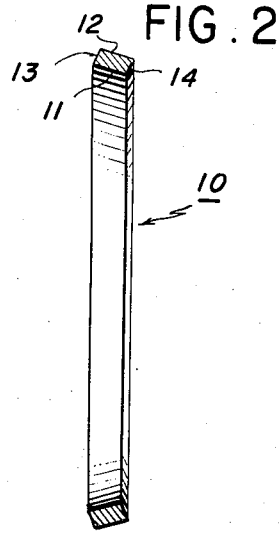
Fig. 2 is a section taken along line 2—2 of Fig. 1.

Referring to the drawings, a coupling ring as herein proposed comprises an open-ended spring ring 10 having frusto-conical shape imparted, for example, by dishing an initially cylindrical open-ended ring having preferably rectangular section to the form of a truncated cone. Thus, the parallel inner and outer peripheral surfaces 11 and 12 of the ring are frusto-conical and the radial end faces 13, 14 are normal to said faces and hence to the coning angle of the ring.

According to the invention, such a ring is employed as the coupling element between two concentric members, illustratively a shaft 15 operating in a housing 16. In the Fig. 3 form of coupling, the ring 10 seats more or less tightly against the bottom of a groove cut or otherwise provided therefor in the bore of the housing and, to accommodate for the coning of the ring, the groove is inclined to the axis of the shaft and housing by an angle corresponding to coning angle of said ring. Accordingly, the bottom wall 18 of said groove is inclined complementally to the outer peripheral surface 12 of the ring, and the one side wall 19 which is abutted by the larger-diameter radial end face 13 of the ring is correspondingly inclined to the inclination of said radial end face. According to the invention, the aforesaid housing groove is relatively shallow, so that its other side wall 20 has substantially decreased depth as compared to that of the aforesaid side wall 19, and it is also to be noted that said short-depth side wall 20, rather than having inclination complemental to that of the corresponding radial end face 14 of the ring, is inclined away from said end face.

Figure 3:
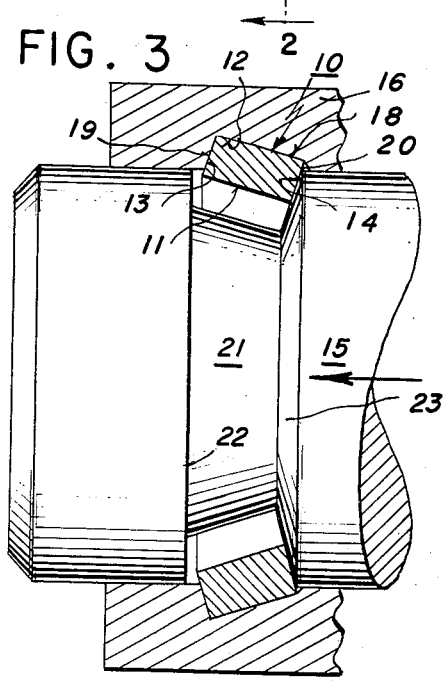
Fig. 3 is a vertical section taken through one form of the releasable coupling for two concentric members according to the invention, wherein a coupling ring as shown in Fig. 1 seats in the groove of the outer member.

The mutually facing and correspondingly coned shaft groove is formed deep, being defined by a bottom wall 21 which is cut conical to correspond generally to the coning angle of the coupling ring 10, and by side walls 22 and 23. Preferably, the groove has some extra width so that the side wall 22 adjacent the larger-diameter end of the coupling ring 10 is spaced from said end and hence may be formed straight, as illustrated. However, the other side wall 23 is sloped or inclined to correspond to the inclination of the abutting smaller-diameter radial end face 14 of the ring 10. It will be observed also that the shaft groove is much deeper than is required merely to receive the ring when the latter is in its operative coupling relation as illustrated in Fig. 3. That is to say, it has sufficient depth as to be capable of bodily receiving the ring 10 upon the latter disengaging from the housing groove.

In the normal relationship of parts illustrated, the inclined side wall 23 of the shaft groove abuts the smaller-diameter radial end face 14 of the ring, and the other radial face 13 of the ring abuts substantially throughout its full depth the correspondingly inclined deep side wall 19 of the housing groove. Accordingly, axial load applied to the coupled assembly in the direction of the arrow is adequately resisted to substantially the same extent that such load is resisted by the prior couplings employing the cylindrically disposed coupling ring and the straight side-wall grooves in housing and shaft. However, should it be desired to separate the coupling, a load or force is applied in the opposite axial direction. Such results in the frusto-conical ring 10 being pressed axially against the shallow-depth, oppositely inclined wall 20 of the housing groove, and in said ring being contracted into the shaft groove by an amount such that it disengages completely from the housing groove. When this takes place, the coupling action of the ring 10 is completely eliminated so that the housing and shaft may now be readily moved in the relative direction required to separate one from the other.

Figure 4:
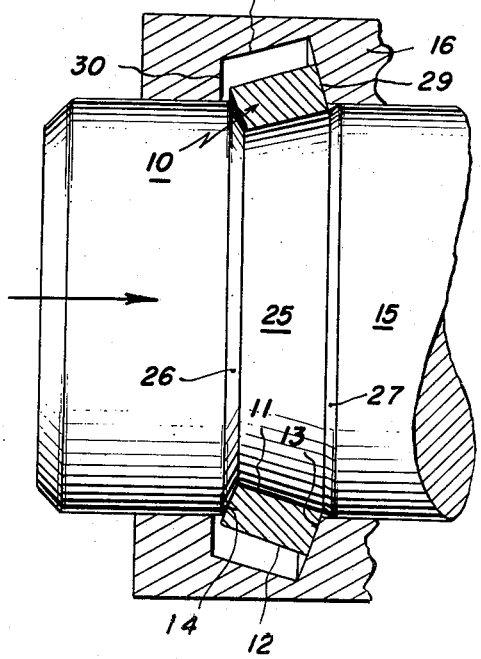
Fig. 4 is a view similar to Fig. 3 but illustrating the reverse arrangement wherein the coupling ring seats in the groove of the inner member.

In the form of coupling illustrated in Fig. 4, the identical ring 10 may be employed but it is turned or faced in the direction opposite to that in which it is employed in Fig. 3 and, rather than seating in the housing groove, it seats in the shaft groove. To provide for such a modified arrangement, the shaft groove is defined by a bottom wall 25 which is inclined to correspond to the coning angle of the inner peripheral surface 11 of the ring, by a side wall 26 which is inclined to correspond to the inclination of the smaller-diameter radial end face 14 of the ring, and by an opposite side wall 27 which is inclined in the opposite direction from that of the larger-diameter radial end face 13 of the ring. It is also to be observed that in the Fig. 4 form of coupling the shaft groove, rather than the housing groove, is formed shallow but that, by virtue of its being inclined to correspond to the coning angle of the ring, its depth is nevertheless such that its deeper side wall 26 against which the smaller-diameter radial end face 14 of the ring abuts has depth equalling substantially the full radial depth of the ring.

The housing groove, which in this instance is formed deep, is defined by a bottom wall 28, by a side wall 29 having inclination corresponding to the inclination of the larger-diameter radial end face 13 of the ring, and by an opposite side wall 30 which may be formed straight and, by virtue of the extra width provided in the housing groove, is preferably spaced axially away from the small diameter radial end face of the ring 10.

In the normal relation of the parts shown in Fig. 4, the deeper side wall 26 of the shaft groove abuts the smaller-diameter radial end face 14 of the ring and the larger-diameter radial end face thereof abuts the inclined side wall 29 of the housing groove. Thus, axial load on the assembly applied in the direction of the arrow is ably resisted by the herein conical coupling ring as with the conventional coupling ring. However, should it be desired to separate the so coupled parts, an axial force is applied in the opposite direction. When such occurs, the ring 10 is expanded into the deeper housing groove by the camming action of the inclined side wall 27 of the shaft groove until finally it disengages from the shaft groove, whereupon the shaft may be withdrawn from the housing, or vice versa.

Without further analysis, it will be seen that through the relatively simple expedient of fashioning a coupling ring of elongated and preferably rectangular section to the form of a dished truncated cone, and by a complemental coning and prescribed dimensioning of the radially aligned grooves of concentric members to be coupled by the ring, there is provided a coupling which to all practical purposes is insurmountable against axial forces applied to said members in one direction but which may be easily disconnected so as to permit separation of the parts as and when such is desired. Accordingly, the invention greatly enlarges the application of ring-form couplings of the general type disclosed to uses and fields wherein it is desirable or necessary to make provision for separation of the coupling without destroying or impairing the coupling ring as heretofore.

As many changes could be made in carrying out the above constructions without departing from the scope of the invention, it is intended that all matter contained in the above description or shown in the accompanying drawing shall be interpreted as illustrative and not in a limiting sense.

I claim:

1. In a releasable coupling, the combination of concentric inner and outer members having mutually facing grooves which are normally disposed in radially aligned relationship, an open-ended spring ring of frusto-conical shape normally seating in the groove of one of said members and extending into the groove of the other member so as normally to couple said members, said last-named groove having depth substantially exceeding that required to receive the ring extending thereinto as aforesaid said ring having radial end faces disposed at right angles to the coned peripheral faces thereof, said grooves being inclined to the axis of said members by an angle corresponding to the coning angle of the ring, the smaller-diameter radial end face of the ring normally abutting a correspondingly inclined side wall of the groove of the inner member, and the larger-diameter radial end face of the ring normally abutting a correspondingly inclined side wall of the groove of the outer member, whereby the ring resists axial separating force applied to the assembly in one direction, and means for camming the ring from its seating groove and into the deeper groove of the other member responsively to axial force applied to the assembly in the opposite direction.

2. The combination as set forth in claim 1, wherein said last means includes one side wall of the ring-seating groove.

References Cited in the file of this patent

UNITED STATES PATENTS

| 1,216,218 | Eddowes | Feb. 13, 1917 |
| 1,867,296 | Woodruff | July 12, 1932 |
| 2,379,053 | Weingart | June 26, 1945 |
| 2,544,631 | Heiman et al. | Mar. 6, 1951 |